United States Patent
Faller et al.

(10) Patent No.: US 12,392,795 B2
(45) Date of Patent: Aug. 19, 2025

(54) MATRIX AND ASSOCIATED SAMPLE OR MIXING CUP USED FOR REMOVING COMPONENTS OF A LIQUID SAMPLE

(71) Applicant: IDEXX Laboratories, Inc., Westbrook, ME (US)

(72) Inventors: Jesse Daniel Faller, Portland, ME (US); Robert W. Lachapelle, Leeds, ME (US); Dominic Pelletier, Raymond, ME (US)

(73) Assignee: IDEXX Laboratories, Inc., Westbrook, ME (US)

( * ) Notice: Subject to any disclaimer, the term of this patent is extended or adjusted under 35 U.S.C. 154(b) by 537 days.

(21) Appl. No.: 17/195,020

(22) Filed: Mar. 8, 2021

(65) Prior Publication Data

US 2021/0278431 A1    Sep. 9, 2021

Related U.S. Application Data

(60) Provisional application No. 62/987,077, filed on Mar. 9, 2020.

(51) Int. Cl.
*G01N 35/10* (2006.01)
*G01N 1/40* (2006.01)
(Continued)

(52) U.S. Cl.
CPC .......... *G01N 35/1072* (2013.01); *G01N 1/40* (2013.01); *G01N 35/1011* (2013.01);
(Continued)

(58) Field of Classification Search
None
See application file for complete search history.

(56) References Cited

U.S. PATENT DOCUMENTS

| 4,389,491 A | 6/1983 | Hanamoto |
| 4,644,807 A * | 2/1987 | Mar ............... G01N 30/18 |
| | | 422/68.1 |

(Continued)

FOREIGN PATENT DOCUMENTS

| JP | H07500417 | 1/1995 | |
| JP | H08332315 A | 12/1996 | ............ B01D 35/02 |

(Continued)

OTHER PUBLICATIONS

Malynych, et al. "*Poly(Vinyl Pyridine) as a Universal Surface Modifier for Immobilization of Nanoparticles*", Journal of Physical Chemistry, vol. 106, Issue 6, pp. 1280-1285, Jan. 19, 2002. Abstract available at: https://pubs.acs.org/doi/10.1021/jp013236d (last accessed on Jul. 29, 2021) (full copy of publication enclosed).

(Continued)

*Primary Examiner* — P. Kathryn Wright
(74) *Attorney, Agent, or Firm* — McDonnell Boehnen Hulbert & Berghoff LLP

(57) ABSTRACT

An insert mounted in a mixing cup and used by an automated chemical analyzer for removing a targeted component of a liquid sample includes a porous matrix formed of or carrying in an immobilized state functionalized particles having properties such that the targeted component of the liquid sample adheres to the functionalized particles. When the liquid sample is expelled from a disposable tip fitted on the end of a pipette forming part of the automated chemical analyzer into the mixing cup, the liquid sample is drawn into the matrix of the insert by capillary action, whereupon the targeted component of the liquid sample adheres to the immobilized functionalized particles of the matrix.

28 Claims, 9 Drawing Sheets

(51) Int. Cl.
  *G01N 30/52* (2006.01)
  *G01N 35/00* (2006.01)
(52) U.S. Cl.
  CPC . *G01N 2030/525* (2013.01); *G01N 2030/528* (2013.01); *G01N 2035/00564* (2013.01); *G01N 2035/1013* (2013.01); *G01N 2035/1058* (2013.01)

(56) References Cited

U.S. PATENT DOCUMENTS

| | | | |
|---|---|---|---|
| 4,965,187 A * | 10/1990 | Tonelli | G01N 33/528 435/5 |
| 5,073,344 A | 12/1991 | Smith | |
| 5,120,504 A * | 6/1992 | Petro-Roy | G01N 33/5302 435/287.8 |
| 5,384,248 A | 1/1995 | Sakata | |
| 5,689,347 A | 11/1997 | Naoi | |
| 5,726,010 A | 3/1998 | Clark | |
| 5,869,347 A | 2/1999 | Josef et al. | 436/536 |
| 7,150,973 B2 | 12/2006 | Johnson et al. | 435/7.1 |
| 7,563,410 B2 | 7/2009 | Abele et al. | 422/417 |
| 7,850,917 B2 | 12/2010 | Ding | |
| 9,116,129 B2 | 8/2015 | Rich et al. | |
| 9,797,916 B2 | 10/2017 | Connolly et al. | |
| 9,823,109 B2 | 11/2017 | Garrepy et al. | |
| 9,933,428 B2 | 4/2018 | Chan et al. | |
| 10,335,785 B2 | 7/2019 | Walsh | |
| 10,495,614 B2 | 12/2019 | Pohl | |
| 10,641,768 B2 | 5/2020 | Yoshimura et al. | |
| 10,908,145 B2 | 2/2021 | Sinn Blandy et al. | |
| 11,747,244 B2 | 9/2023 | Glauser et al. | |
| 2003/0113316 A1 | 6/2003 | Kaisheva | |
| 2004/0171169 A1 | 9/2004 | Kallury et al. | 436/178 |
| 2004/0259162 A1* | 12/2004 | Kappel | C12N 15/1017 435/7.1 |
| 2006/0083659 A1* | 4/2006 | Abele | G01N 35/028 422/417 |
| 2006/0110295 A1 | 5/2006 | Wohleb | 422/400 |
| 2007/0143063 A1 | 6/2007 | Kaplit | |
| 2009/0325263 A1 | 12/2009 | Ponaka | |
| 2010/0092980 A1 | 4/2010 | Lee | |
| 2010/0224012 A1* | 9/2010 | Modic | G01N 30/14 210/806 |
| 2012/0071643 A1 | 3/2012 | Helfer et al. | |
| 2012/0202238 A1 | 8/2012 | Hyde | |
| 2013/0017545 A1 | 1/2013 | Yong et al. | |
| 2013/0302384 A1 | 11/2013 | Hiraoka | |
| 2014/0288398 A1 | 9/2014 | Simberg | |
| 2015/0219636 A1 | 8/2015 | Rychak | |
| 2015/0240291 A1 | 8/2015 | Koeda | |
| 2016/0187306 A1* | 6/2016 | Pohl | G01N 30/6065 436/178 |
| 2019/0234944 A1* | 8/2019 | Chun | G01N 33/54306 |
| 2019/0336916 A1 | 11/2019 | McNeely | |
| 2019/0346348 A1* | 11/2019 | Glauser | G01N 33/54386 |
| 2020/0398225 A1* | 12/2020 | McNeely | B01D 61/00 |
| 2022/0016619 A1* | 1/2022 | Sager | B03C 1/32 |

FOREIGN PATENT DOCUMENTS

| | | | |
|---|---|---|---|
| JP | 2000338014 A | 12/2000 | G01N 1/22 |
| JP | 2004535563 A | 11/2004 | B01D 61/18 |
| JP | 2006119136 A | 5/2006 | B01L 99/00 |
| JP | 2008070346 | 3/2008 | |
| JP | 2015114197 | 6/2015 | |
| JP | 2015159733 | 9/2015 | |
| JP | 2018128394 | 8/2018 | |
| JP | 2019197052 | 11/2019 | |
| WO | WO9303779 | 3/1993 | |
| WO | WO0237100 | 5/2002 | |
| WO | WO0237100 A2 | 5/2002 | B01D 15/38 |
| WO | WO2013041556 A1 | 3/2013 | C07K 1/18 |
| WO | WO2020023899 | 1/2020 | |
| WO | WO2020127902 | 6/2020 | |
| WO | WO-2020127902 A1 * | 6/2020 | B01L 3/0275 |

OTHER PUBLICATIONS

Loos, et al. "*Functionalized polystyrene nanoparticles as a platform for studying bio-nano interactions*", Beilstein Journal of Nanotechnol, vol. 5, pp. 2403-2412, Dec. 15, 2014. Text available at: https://www.beilstein-journals.org/bjnano/articles/5/250 (last accessed on Jul. 29, 2021) (copy not enclosed).

Arruebo, et al. "*Antibody-Conjugated Nanoparticles for Biomedical Applications*", Journal of Nanomaterials, vol. 2009, Article ID 439389, pp. 1-24, Dec. 3, 2009. Text available at: https://www.hindawi.com/journals/jnm/2009/439389/ (last accessed on Jul. 29, 2021) (copy not enclosed).

Simms, et al. "*Development of zinc chelating resin polymer beads for the removal of cell-free hemoglobin*", Annals of Biomedical Engineering, vol. 47, Issue 6, pp. 1470-1478, Jun. 15, 2019. Text available at: https://www.ncbi.nlm.nih.gov/pmc/articles/PMC6506348/ (last accessed on Jul. 29, 2021) (copy not enclosed).

The Notification of Transmittal of the International Search Report and the Written Opinion of the International Searching Authority, or the Declaration, dated May 20, 2021, which was issued by the International Searching Authority of WIPO in Applicant's corresponding international PCT application having Serial No. PCT/US2021/021359, filed on Mar. 8, 2021.

The Written Opinion of the International Searching Authority, dated May 20, 2021, which was issued by the International Searching Authority of WIPO in Applicant's corresponding international PCT application having Serial No. PCT/US2021/021359, filed on Mar. 8, 2021.

The International Search Report, dated May 20, 2021, which was issued by the International Searching Authority of WIPO in Applicant's corresponding international PCT application having Serial No. PCT/US2021/021359, filed on Mar. 8, 2021.

The Notification of Transmittal of the International Search Report and the Written Opinion of the International Searching Authority, or the Declaration, dated Jul. 23, 2021, which was issued by the International Searching Authority of WIPO in Applicant's related international PCT application having Serial No. PCT/US2021/021331, filed on Mar. 8, 2021.

The Written Opinion of the International Searching Authority, dated Jul. 23, 2021, which was issued by the International Searching Authority of WIPO in Applicant's related international PCT application having Serial No. PCT/US2021/021331, filed on Mar. 8, 2021.

The International Search Report, dated Jul. 23, 2021, which was issued by the International Searching Authority of WIPO in Applicant's related international PCT application having Serial No. PCT/US2021/021331, filed on Mar. 8, 2021.

The Invitation to Pay Additional Fees and, Where Applicable, Protest Fee, dated May 11, 2021, which was issued by the International Bureau of WIPO in Applicant's related international PCT application having Serial No. PCT/US2021/021331, filed on Mar. 8, 2021.

Loos, et al. "*Functionalized polystyrene nanoparticles as a platform for studying bio-nano interactions*", Beilstein Journal of Nanotechnol, vol. 5, pp. 2403-2412, Dec. 15, 2014. Text available at: https://www.beilstein-journals.org/bjnano/articles/5/250 (last accessed on Oct. 26, 2023) (full copy of publication enclosed).

Arruebo, et al. "*Antibody-Conjugated Nanoparticles for Biomedical Applications*", Journal of Nanomaterials, vol. 2009, Article ID 439389, pp. 1-24, Dec. 3, 2009. Text available at: https://www.hindawi.com/journals/jnm/2009/439389/ (last accessed on Oct. 26, 2023) (full copy of publication enclosed).

Simms, et al. "*Development of zinc chelating resin polymer beads for the removal of cell-free hemoglobin*", Annals of Biomedical Engineering, vol. 47, Issue 6, pp. 1470-1478, Jun. 15, 2019. Text available at: https://www.ncbi.nlm.nih.gov/pmc/articles/PMC6506348/ (last accessed on Oct. 26, 2023) (full copy of publication enclosed).

(56) References Cited

OTHER PUBLICATIONS

Office Action, dated Nov. 27, 2023, issued by the Canadian Intellectual Property Office for Applicant's related Canadian Patent Application No. 3,168,312, accorded the international filing date of Mar. 8, 2021.
Communication Pursuant to Rule 62 EPC, dated Mar. 22, 2024, issued by the European Patent Office in Applicant's related European Patent Application No. EP21768597.3, filed on Mar. 8, 2021.
Supplementary European Search Report (Mar. 22, 2024—mailed with the Communication Pursuant to Rule 62 EPC), issued by the European Patent Office in Applicant's related European Patent Application No. EP21768597.3, filed on Mar. 8, 2021.
European Search Opinion (Mar. 22, 2024—mailed with the Communication Pursuant to Rule 62 EPC), issued by the European Patent Office in Applicant's related European Patent Application No. EP21768597.3, filed on Mar. 8, 2021.
Office Action (in Japanese) and an English translation thereof, dated Jun. 11, 2024, issued by the Japanese Patent Office for Applicant's related Japanese Patent Application No. 2022-554623, filed on Sep. 8, 2022.
Bio-Works, "Instruction In 40 650 010", full text available at: https://www.ikb-biotech.pl/wp-content/uploads/2017/09/WorkBeads-40-NTA-IDA-pre-charged-with-metal-instructions.pdf (retrieved on Feb. 26, 25).
Bio-Works, "Work Beads NTA", full text available at: https://www.bio-works.com/product/imac-resin/workbeads-nta (retrieved on Feb. 26, 25).
Bio-Works, "Data Sheet Ds 40 650 010", full text available at: https://blog.bio-works.com/hubfs/Documents/DS-40-650-010-AA-WorkBeads-Charged-40-NTA-and-40-IDA.pdf?hsLang=en.
Dana, "Cross Cutting", full text available at: https://nanopartikel.info/en/basics/cross-cutting/.
Loos, et al., Functionalized polystyrene nanopartilces as a platform for studying bio-nano interactions, Beilstein Journal of Nanotechnol., vol. 5:2403-2412 (2014).
Arrubeo, et al., "Antibody-Conjugated Nanoparticles for Biomedical Application", Journal of Nanomaterials, VOI 2009, Article ID 439389, pp. 1-24 (2009).
Simms, et al., "Development of zinc chelating resin polymer beads for the removal of cell-free hemoglobin", Annals of Biomedical Engineering, 47:1470-1478 (2019).
Antoinades, et al., "Studies on the State of Insulin in Blood: Materials and Methods for the Estimation of "Free" and "Bound" Insulin-Like Activity in Serum", Endocrinology, 70:95-98 (1962).
Porex Filtration Group, "Porous Polymers Technologies", full text available at: https://www.porex.com/porous-polymers-technology/.
GE Osmonics, "Osmonics MAGNA Nylong Transfer membrante", full text avialable at: https://www.krackeler.com/catalog/product/3751/Osmonics-MAGNA-Nylon-Transfer-Membrane.
Milliporesigma, "Durapore Membrane Filter", full text available at: https://www.emdmillpore.com/US/en/product/Durapore-Memprane LFilters, MM_NF-C7631#overview.
Celanese, "Binders for Glass Fiber Chopped Strand Mat Production", full text available at: https://Www.celanese.com/emulsion-polymers/product-groups/Glass-filber-0CSM-polymers-europe.aspx (retrieved on Feb. 26, 25).

\* cited by examiner

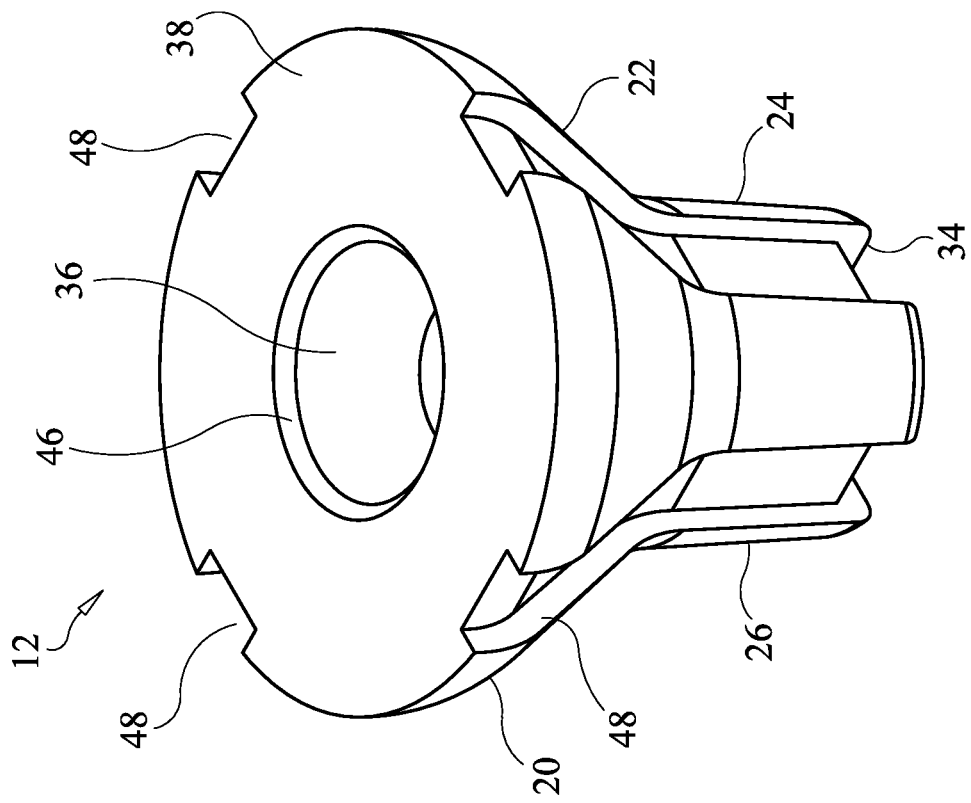
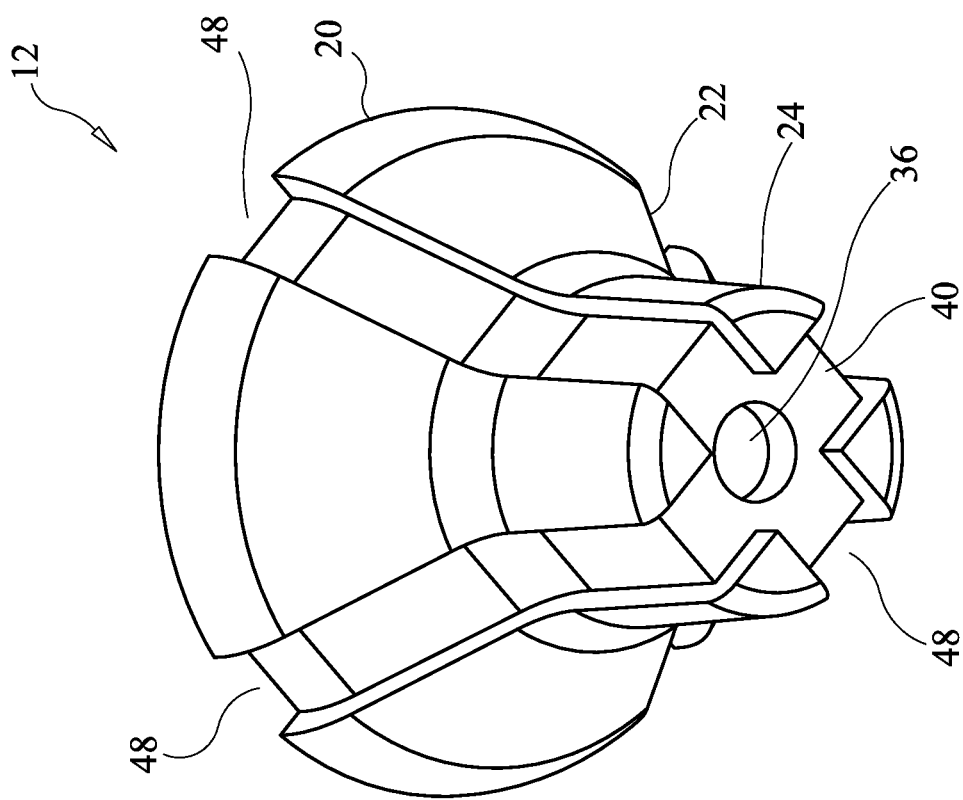

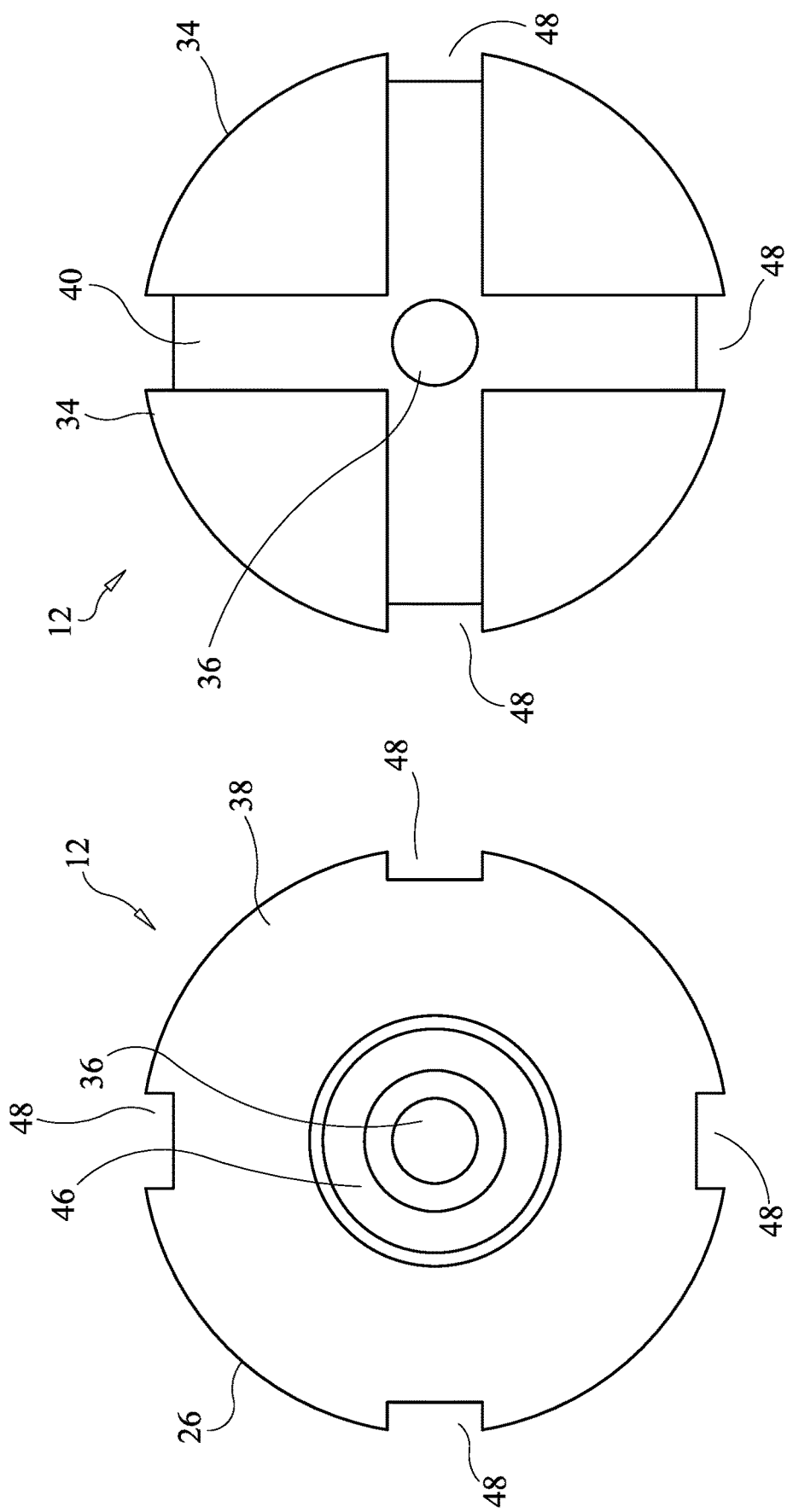

MATRIX AND ASSOCIATED SAMPLE OR MIXING CUP USED FOR REMOVING COMPONENTS OF A LIQUID SAMPLE

CROSS-REFERENCE TO RELATED APPLICATIONS

This application is related to U.S. Provisional Patent Application Ser. No. 62/987,077, filed on Mar. 9, 2020, and titled "Matrix And Associated Sample Or Mixing Cup Used For Removing Components Of A Liquid Sample", the disclosure of which is hereby incorporated by reference and on which priority is hereby claimed.

This application is also related to U.S. Provisional Patent Application Ser. No. 62/986,988, filed Mar. 9, 2020, and titled "Method for Removing Interfering Components of a Liquid Sample Prior to Dispensing Same on a Chemical Reagent Test Slide", naming IDEXX Laboratories, Inc. as the applicant, the disclosure of which is incorporated herein by reference.

BACKGROUND OF THE INVENTION

Field of the Invention

The present invention generally relates to techniques for removing components from a liquid sample, and more particularly relates to methods, devices and other aids which are employed to remove components, such as proteins, hemoglobin, analytes and other constituents, from a blood sample.

Description of the Related Art

Aforementioned U.S. Patent Application Ser. No. 62/986,988 (hereinafter, the "IDEXX patent application") discloses novel methods and devices which may be used to remove a component of a liquid sample, such as whole blood, diluted blood, plasma, serum or the like (generally referred to herein as a "blood sample") which may interfere with tests performed or measurements taken by an automated chemical analyzer, such as those manufactured and sold by IDEXX Laboratories, Inc. under the trademarks VetTest®, Catalyst Dx® and Catalyst One®. For example, hemoglobin in a blood sample may affect the accuracy of measurements performed on bile acid assays. The aforementioned IDEXX patent application describes methods employing porous and non-porous beads, such as agarose-based and silica-based beads, held in a mixing cup to which the blood sample is added. Hemoglobin in the blood sample adheres to the beads, and the hemoglobin-attached beads settle by gravity over time to the lower portion of the cup. The hemoglobin-free blood sample occupying the upper portion of the cup may now by aspirated by a pipette of a sample metering device forming part of the chemical analyzer and deposited on a test slide.

OBJECTS AND SUMMARY OF THE INVENTION

It is an object of the present invention to provide a matrix having structural features that cause a targeted component of a liquid sample to adhere thereto to provide a targeted component-free or targeted component-diminished sample that may be subsequently added to a test slide or cuvette used for assays.

It is another object of the present invention to provide a matrix which may form part of a sample cup, a mixing cup, a reagent cup or a centrifuge cup and which may be used to remove or lower the concentration of a component of a liquid sample.

It is still another object of the present invention to provide a matrix/cup combination that is used with an automated chemical analyzer to remove an impurity or other unwanted component of a liquid sample, such as a "blood sample", as broadly defined herein, prior to the sample being dispensed on a dry chemistry reagent test slide.

It is a further object of the present invention to provide a method for removing components of a liquid sample that may interfere with diagnostic measurements performed on the liquid sample.

It is yet a further object of the present invention to provide a matrix that is receivable by, or forms part of, a sample or mixing cup used by an automated chemical analyzer, and which carries functionalized particles to which a component of a liquid sample added to the cup adheres to remove the component therefrom prior to the sample being tested.

It is still a further object of the present invention to provide a sample, mixing, reagent or centrifuge cup used with an automated chemical analyzer and containing a matrix which removes hemoglobin or other constituents of a "blood sample", as broadly defined herein, that may affect the accuracy of tests performed on the blood sample.

It is another object of the present invention to provide a liquid sample mixing/dispensing technique that removes undesirable components of the liquid sample which may affect tests performed on the liquid sample and measurements derived therefrom.

It is yet another object of the present invention to provide a pretreated or filtered liquid sample having a minimized or negligible concentration of a component, such as hemoglobin in a blood sample, of the liquid sample prior to the pretreated or filtered liquid sample being dispensed on a dry chemistry reagent test slide, such as a bile acid assay test slide.

It is a further object of the present invention to use a currently available, automated chemical analyzer for analyzing reagent test slides and a specially designed mixing cup formed in accordance with the present invention that is used by the analyzer and that receives a liquid sample which, together, condition the liquid sample such that the sample has a reduced concentration of an interfering component which may have otherwise affected the accuracy of fluorescence or absorbance/reflectance measurements derived from tests performed on the liquid sample.

It is still a further object of the present invention to provide a method and device for removing components of a liquid sample using a conventional chemical analyzer and dispensing the liquid sample on a conventional, unmodified, dry chemistry reagent test slide.

It is still another object of the present invention to provide a specialized matrix carrying functionalized particles that is used to pre-condition a liquid sample by removing or minimizing the presence of an interfering or unwanted component thereof prior to dispensing the liquid sample on a conventional reagent test slide.

In accordance with one form of the present invention, a matrix is formed of porous media through which fluid can flow. In one form, the matrix holds in an immobilized state functionalized particles that remove a component of a fluid flowing through the matrix. For example, the porous matrix immobilizes porous or non-porous agarose-based IMAC (Immobilized Metal Affinity Chromatography) beads or silica-based IMAC beads, or other functionalized particles, to which a component or components of a liquid sample passing through the matrix adhere. Such components are thus removed from the liquid sample, or their concentration therein is lowered, to provide a filtered liquid sample which may be dispensed on a chemical reagent test slide or a sample holding cuvette of an automated chemical analyzer.

The matrix may be in the form of an insert or plug that forms part of a sample or mixing cup, reagent cup, or a centrifuge cup, used by the automated chemical analyzer. For example, a blood sample is aspirated from a sample cup into a disposable tip fitted on the end of a pipette connected to a pump of a sample metering device forming part of the automated chemical analyzer, and is transferred to the mixing cup containing the matrix by the pipette expelling the blood sample from the tip into the cup. The blood sample, drawn into the matrix by capillary action or forced into the matrix under the influence of hydraulic or pneumatic pressure from the pipette and pump connected thereto, flows through the matrix residing in the mixing cup either once or multiple times, as needed.

A targeted component of the blood sample, such as hemoglobin, for example, has an affinity for and adheres to the functionalized particles, such as the IMAC beads mentioned previously, that are immobilized by the matrix, and is removed from the blood sample or at least its concentration therein is lowered. The filtered blood sample filling the matrix is withdrawn from the matrix under negative fluid pressure caused by the reverse pumping action of the pipette and flows out through the matrix at the lower portion of the mixing cup, where it is re-aspirated by the pipette and, if necessary, re-introduced to the matrix in the mixing cup multiple times until the targeted component of the filtered blood sample is completely removed or a desired concentration of the component in the filtered blood sample is achieved.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 1 is a bottom perspective view of one form of a matrix of the present invention that is shaped as an insert or plug that is receivable in a sample, reagent or mixing cup and which is formed of or carries in an immobilized state functionalized particles to which adheres a targeted component of a liquid sample added to the cup.

FIG. 2 is a top perspective view of the matrix insert or plug of the present shown in FIG. 1.

FIG. 9 is a top plan view of the matrix insert or plug of the present invention shown in FIGS. 7 and 8.

FIG. 10 is a bottom plan view of the matrix insert or plug of the present invention shown in FIGS. 7-9.

DETAILED DESCRIPTION OF THE PREFERRED EMBODIMENTS

Figure 4:
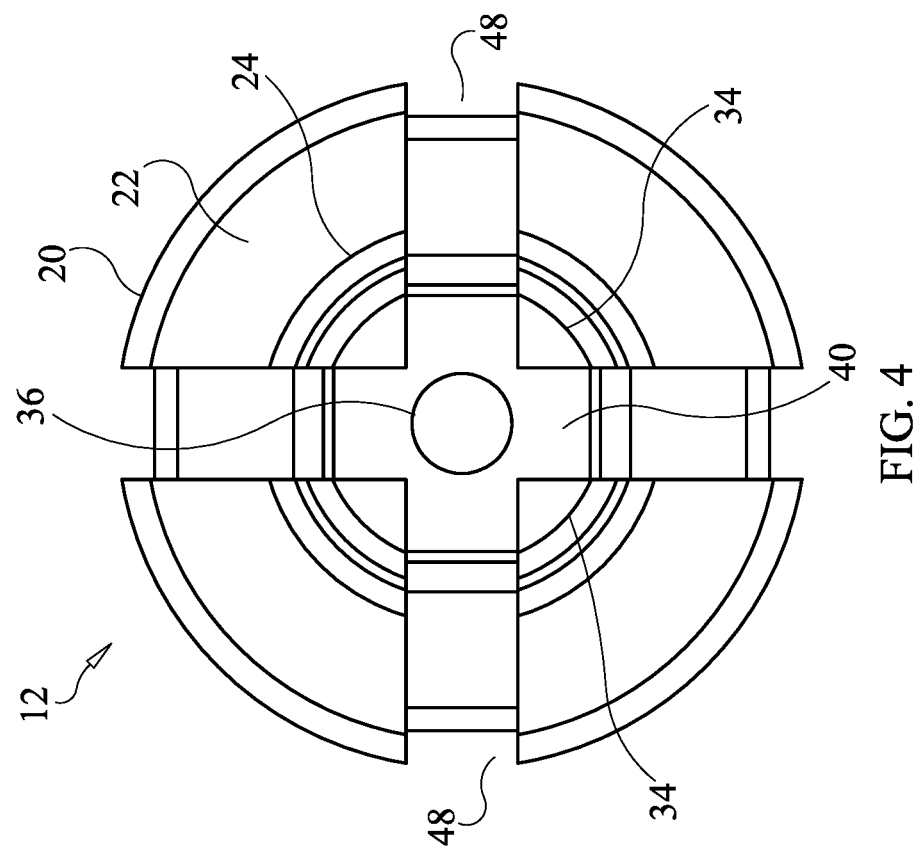
FIG. 4 is a bottom plan view of the matrix insert or plug of the present invention shown in FIGS. 1-3.
Figure 3:
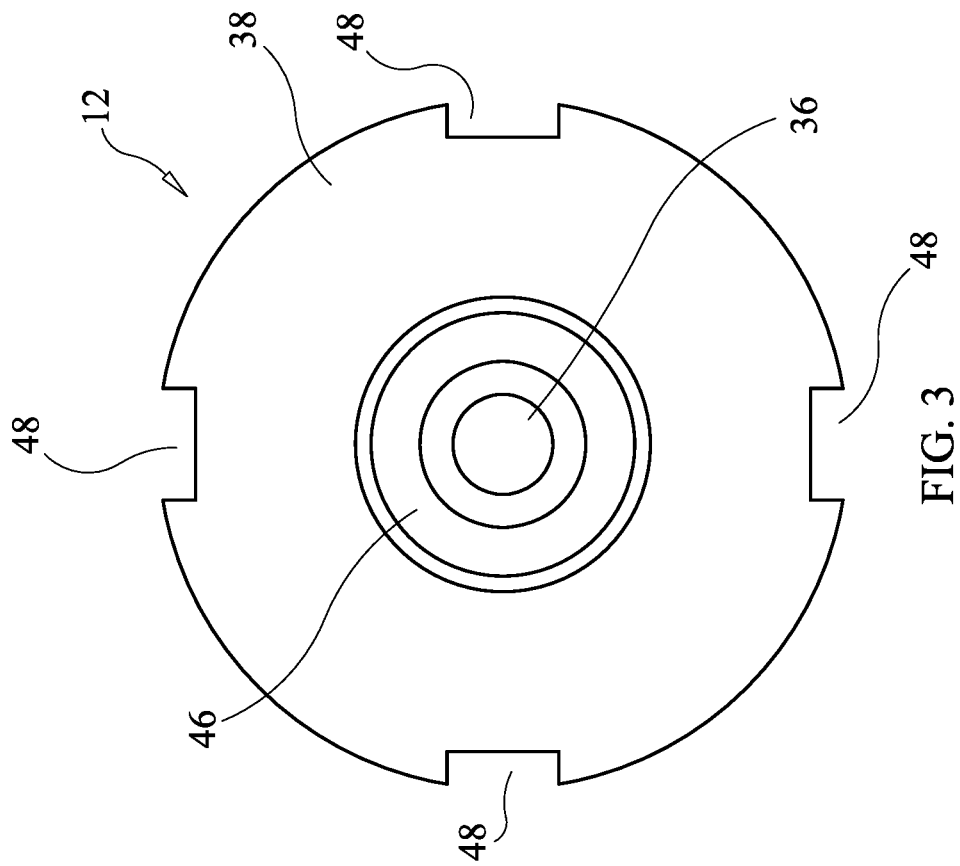
FIG. 3 is a top plan view of the matrix insert or plug of the present invention shown in FIGS. 1 and 2.
Figure 6:
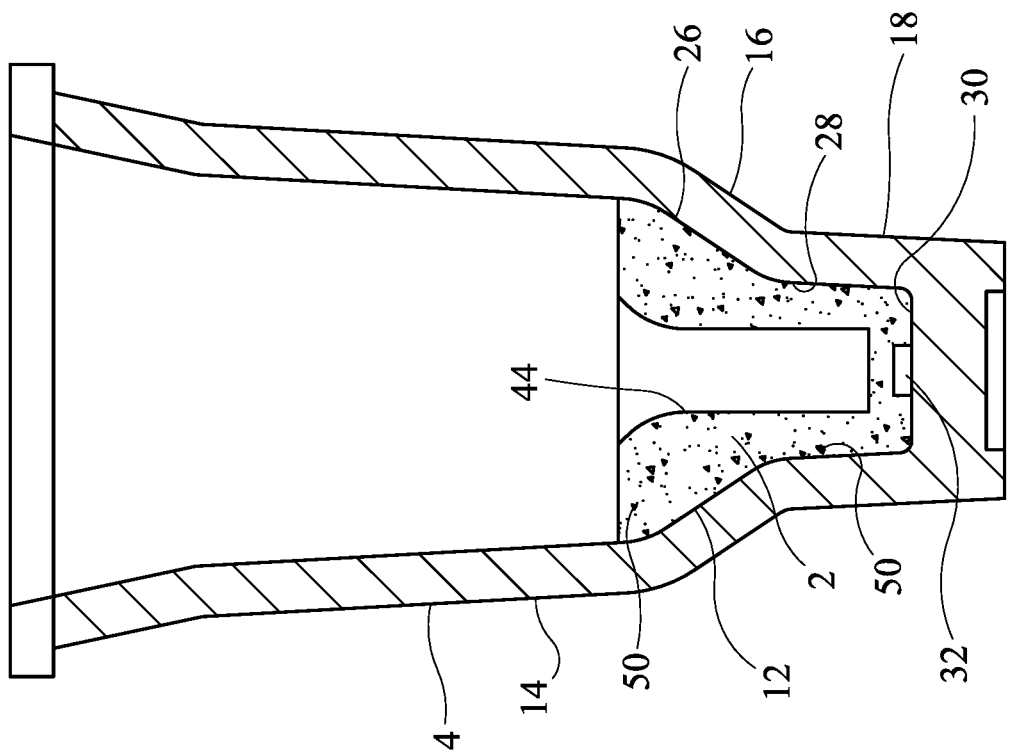
FIG. 6 is a cross-sectional view of the matrix insert or plug of the present invention shown in FIGS. 1-5, taken along line 6-6 of FIG. 5, along with a cross-sectional view of a mixing cup into which the matrix insert or plug is received.
Figure 5:
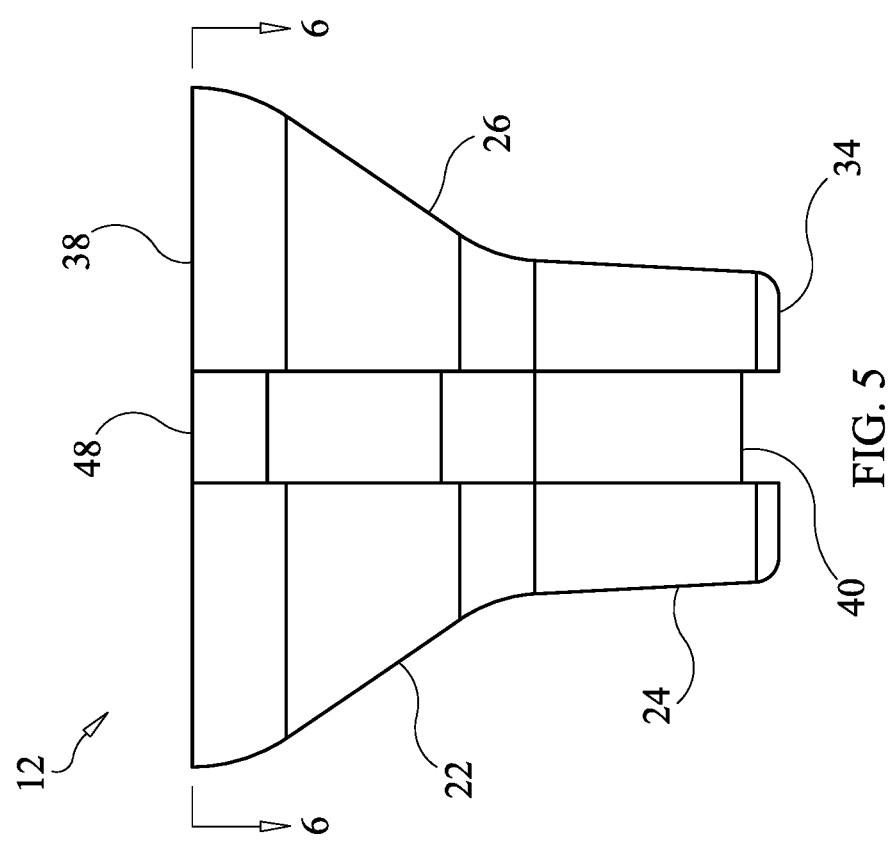
FIG. 5 is a side elevational view of the matrix insert or plug of the present invention shown in FIGS. 1-4.
Figure 8:
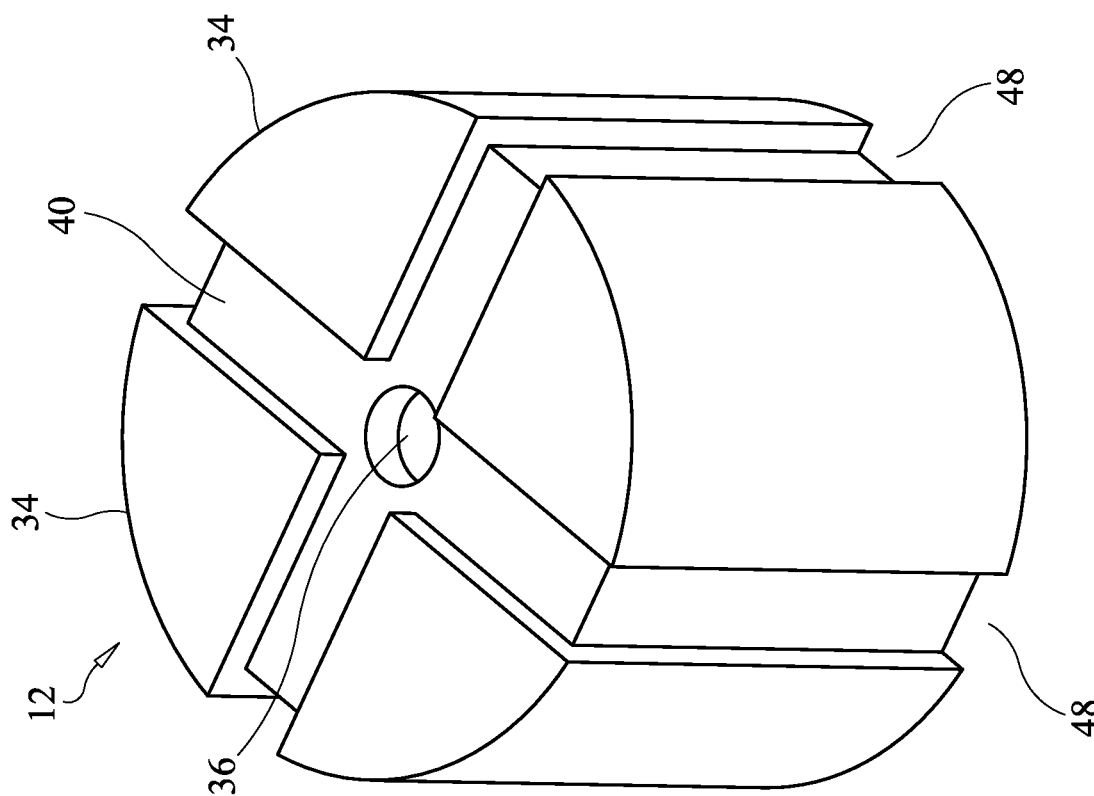
FIG. 8 is a top perspective view of the matrix insert or plug of the present invention shown in FIG. 7.
Figure 7:
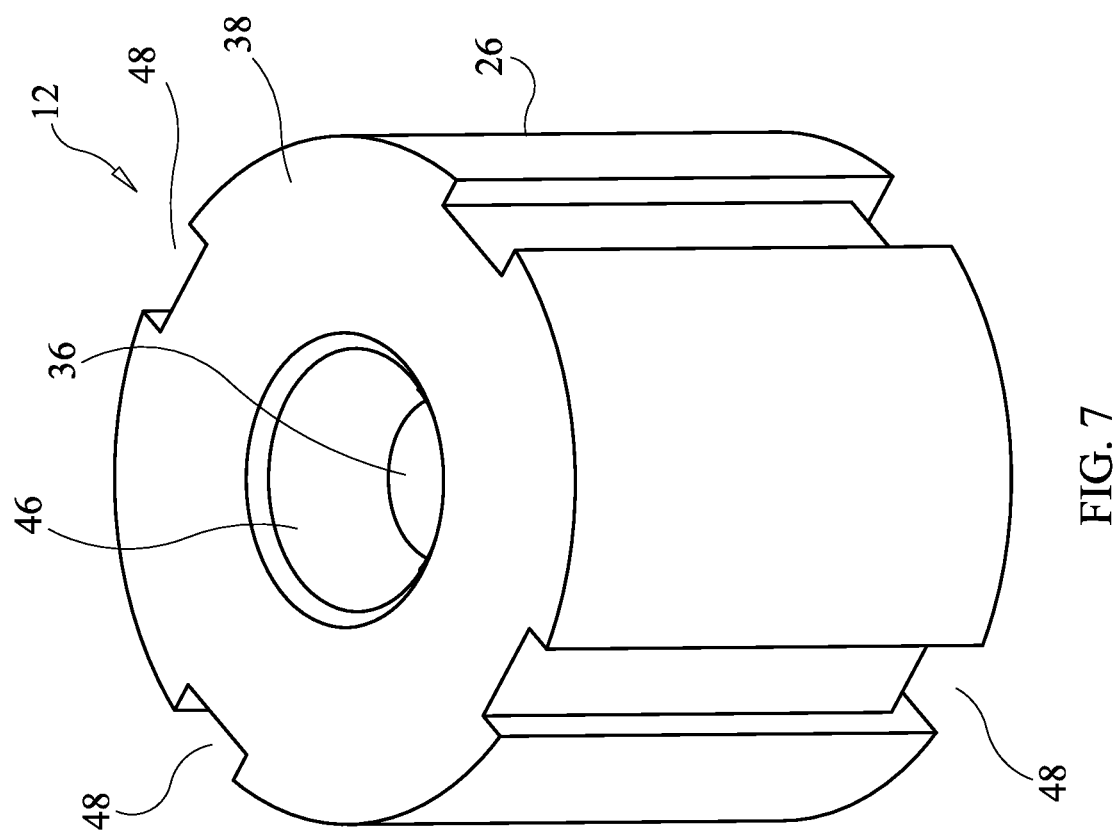
FIG. 7 is a bottom perspective view of another form of a matrix of the present invention that is shaped as an insert or plug that is receivable in a sample, reagent or mixing cup and which is formed of or carries in an immobilized state functionalized particles to which adheres a targeted component of a liquid sample added to the cup.
Figure 12:
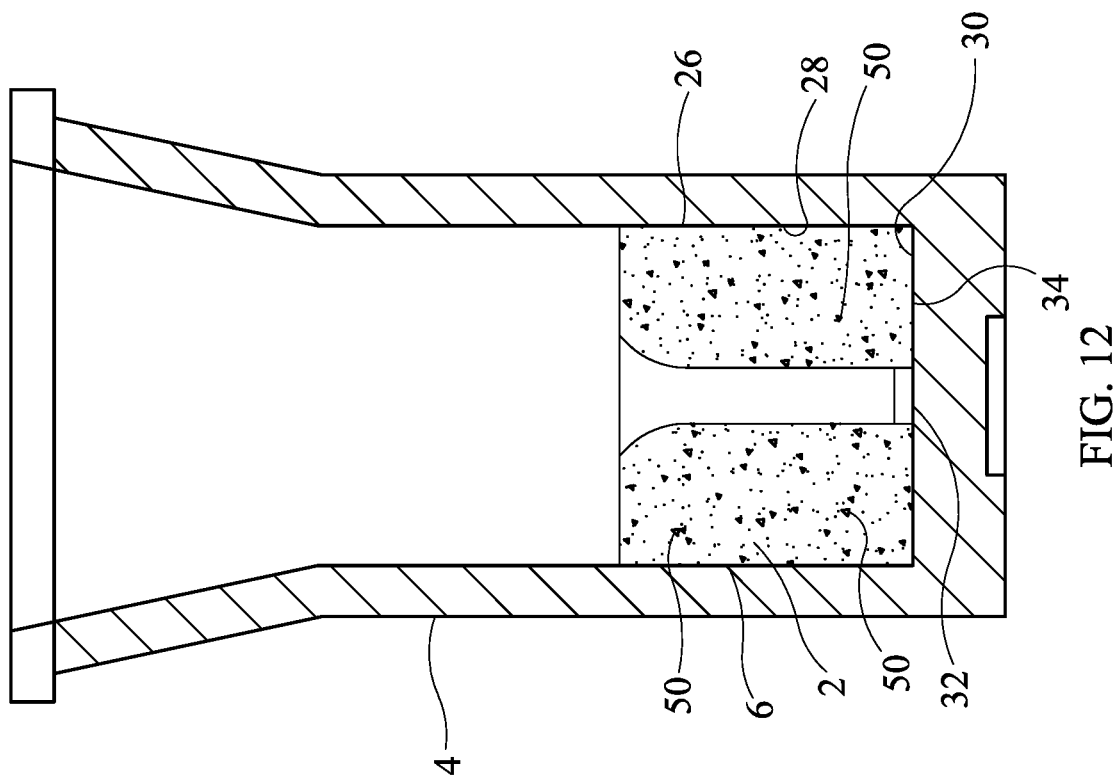
FIG. 12 is a cross-sectional view of the matrix insert or plug of the present invention shown in FIGS. 7-11, taken along line 12-12 of FIG. 11, along with a cross-sectional view of a mixing cup into which the matrix insert or plug is received.
Figure 11:
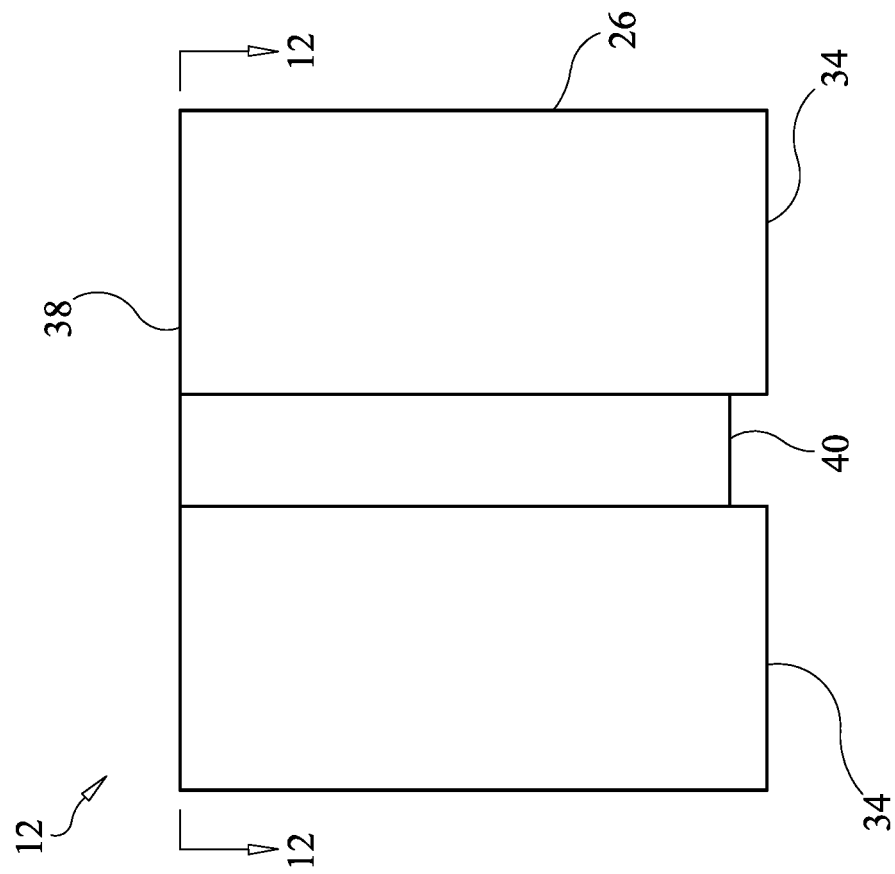
FIG. 11 is a side elevational view of the matrix insert or plug of the present invention shown in FIGS. 7-10.

FIGS. 1-12 show various constructions of a matrix 2 in a mixing or reagent cup 4 formed in accordance with the present invention that together are used by an automated chemical analyzer to remove or lower the concentration of a targeted component of a liquid sample 6 prior to the liquid sample 6 being tested. As mentioned previously, the liquid sample 6 may be, but is not limited to, a "blood sample", as herein broadly defined as being whole blood, diluted blood, plasma, serum or the like, and the targeted component may be, but is not limited to, a component which may interfere with tests performed and measurements taken on a liquid sample 6 on a chemical analyzer, such as the component hemoglobin in bile acid assay tests performed by an automated chemical analyzer on a blood sample, such as described in the aforementioned IDEXX patent application, or an antigen, antibody, protein, analyte or some other constituent of a blood sample. By way of background, the automated chemical analyzer includes a sample metering device or sub-assembly having a pipette 8 on which is fitted a disposable pipette tip 10, the pipette 8 being connected to a pump (not shown) so that a liquid sample 6 may be aspirated into or expelled from the pipette tip 10.

In the aforementioned IDEXX patent application, the targeted component of the liquid sample adheres to the IMAC (Immobilized Metal Affinity Chromatography) porous beads in suspension with a liquid sample in a mixing cup, and the beads, with the component adhered thereto, settle by gravity to the bottom portion of the cup. A volume of the component-free liquid sample occupying the upper portion of the cup is aspirated by a pipette into the tip thereof for dispensing the sample onto a test slide. The method and devices disclosed in this present application differ from those described in the aforementioned application in that the IMAC beads, or other functionalized particles, are immobilized in a matrix 2 and do not enter into a suspension with the liquid, as will be explained in greater detail in the forthcoming paragraphs.

As shown in FIGS. 1-6, the matrix 2 is preferably formed as an insert or plug 12 that is shaped to conform closely to the interior shape of the mixing cup, sample cup, reagent cup or centrifuge cup 4 into which the matrix 2 is received. For example, the sample cup, reagent cup and mixing cup 4 used with the aforementioned Catalyst Dx® and Catalyst One® instruments sold by IDEXX Laboratories, Inc. have a generally frusto-conical shape, formed with a generally cylindrical upper portion 14, a tapered middle portion 16 and a generally cylindrical lower portion 18 having a smaller diameter than that of the upper portion 14. Thus, the matrix insert or plug 12 (hereinafter, the "matrix insert"), in the embodiments shown in FIGS. 1-6, has a similar, generally frusto-conical shape, with a generally cylindrical or circular upper portion 20, which leads to a tapered middle portion 22 of decreasing diameter, which in turn leads to a generally cylindrical lower portion 24 having a diameter that is less than that of the upper portion 20. The overall outer dimensions of the matrix insert 12 are chosen based on the interior dimensions of the cup 4 in which it is received so that the matrix insert 12 is closely received by and conforms to the interior shape of the cup 4, with the side walls 26 of the matrix insert 12 closely engaging at least portions of the side walls 28 of the cup 4. Such structure is to ensure that a liquid sample 6 added to the cup 4 will come in contact with the matrix insert 12 residing therein and will be drawn into the matrix 2 by capillary action or by hydraulic or pneumatic pressure caused by the pumping action of the pipette 8 rather than skirt around the outside of the matrix insert 12, as will be described in greater detail.

Alternatively, and as shown in FIGS. 7-12, the matrix insert 12 may take on a cylindrical shape for sample, reagent or mixing cups 4 having a generally cylindrical interior shape. Again, like the embodiment shown in FIGS. 1-6, the dimensions of the cylindrically-shaped matrix insert 12 are selected so that the outer side walls 26 thereof closely engage the inner side walls 28 of the cup 4 in which the matrix insert 12 is received.

In either embodiment of the matrix insert 12 described above and shown in FIGS. 1-12, the matrix insert 12 may be raised slightly from the interior bottom surface 30 of the cup 4 in which it is received to define with the bottom surface 30 a well or chamber 32 of a chosen volume to receive liquid sample 6 either gravitating through the matrix insert 12 or drawn by aspiration from the matrix insert 12 by the pipette 8 forming part of the sample metering sub-assembly of the chemical analyzer. The well or chamber 32 also provides a volume of space to receive the liquid sample 6 expelled by the pipette 8 from the tip 10 thereof. This will also be explained in the paragraphs that follow.

In one form of the matrix insert 12 shown in FIGS. 1-6, the well or chamber 32 may be formed by one or more standoffs 34, which are portions of the matrix insert 12 that extend outwardly and downwardly from the lower portion 24 of the matrix insert 12. The standoffs 34 raise the lower portion 24 of the matrix insert 12 above the interior bottom surface 30 of the cup 4 a predetermined distance to define the chamber or well 32 with a given volume.

The cylindrical matrix insert 12 shown in FIGS. 7-12 may also include one or more standoffs 34, such as shown in FIGS. 1-6, to define the chamber or well 32. However, it should be noted that, if the cylindrical matrix insert 12 is used in cylindrical cups 4 having a curved bottom, similar to a conventional test tube, rather than having a flat bottom, a standoff 34 may not be needed, since the curvature of the bottom of the cup 4 will maintain the matrix insert 12 above the bottom to define with the matrix insert 12 the liquid sample receiving well or chamber 32.

Alternatively, no standoffs 34 are required in either embodiment of the matrix insert 12 if the matrix insert 12 is secured in position within the cup 4 a given distance from the interior bottom surface 30 of the cup 4 to define with the cup 4 the liquid sample receiving well or chamber 32.

Preferably, and as shown in FIGS. 1-12, the matrix insert 12 is formed with a central bore 36 that extends axially through the thickness of the matrix insert 12, from the top surface 38 to the bottom surface 40 of the matrix insert 12. This bore 36 is preferably dimensioned in shape, length and diameter to conform to the outer shape of, and closely receive, the disposable tip 10 extending from the end of the pipette 8. Thus, when the pipette tip 10 is received by the central bore 36 formed in the matrix insert 12, it forms a seal therewith so that liquid sample 6 carried by the pipette tip 10 is expelled therefrom and into the liquid sample receiving well or chamber 32 located at the bottom of the cup 4. Furthermore, the seal formed between the pipette tip 10 and the matrix insert 12 when the tip 10 is received by the matrix bore 36 is desired to ensure there is sufficient reverse hydraulic or pneumatic pressure caused by aspiration by the pipette 8 to draw from the insert 12 component-free liquid sample 6 filling the matrix material of the insert 12. Alternatively, the central bore 36 of the matrix insert 12 may be formed with an oversized interior diameter so that a space 42 is defined between the pipette tip 10 and the interior walls 44 of the matrix insert 12 that define the bore 36 when the pipette tip 10 is received by the bore 32. This annular space 42 is provided so that, when the liquid sample 6 is expelled from the pipette tip 10 into the bottom of the cup 4 in which the matrix insert 12 resides, some of the liquid sample 6 will flow upwardly along the outer side walls of the pipette tip 10 within this space 42 and will come in contact with the interior walls 44 of the matrix insert 12 defining the bore 36 and will be drawn into the matrix 2 thereat by capillary action.

The bore 36 of the matrix insert 12 may be formed with an entry opening 46 having a funnel-like shape at the top surface 38 of the matrix insert 12, such as shown in FIGS. 1-12. The funnel-like shaped entry opening 46 helps direct the free end of the pipette tip 10 properly into the bore 36 of the matrix insert 12.

As is also shown in FIGS. 1-12, the matrix insert 12 may be formed with one channel, or a plurality of channels 48 periodically spaced from each other, and formed as longitudinally extending recesses in the side walls 26 of the matrix insert 12, about the circumference thereof. The channels 48 are in fluid communication with the liquid sample receiving well or chamber 32 situated between the matrix insert 12 and the interior bottom surface 30 of the cup 4. When liquid sample 6 is expelled from the pipette tip 10 into the well or chamber 32, some of the liquid sample 6 will flow into the channels 48, contained therein by the interior side walls 28 of the cup 4, and will be directed to the upper portion 20 of the matrix insert 12 or even the top surface 38 of the matrix insert 12, where it will be drawn into the matrix 2 by capillary action. The channels 48 are provided to help distribute the liquid sample 6 to the upper portion 20 of the matrix insert 12 and the matrix 2 thereat. The channels 48 may extend all the way along the longitudinal length of the matrix insert 12 to provide liquid sample 6 to the top surface 38 thereof, where the sample 6 will be drawn into the matrix 2 from the top surface 38 of the insert 12, or the channels 48 may terminate short of the top surface 38 so that the liquid sample 6 flowing therein will be drawn into the matrix 2 at the side walls 26 of the insert 12.

The matrix 2 is formed from a porous material which permits a liquid sample 6, be it whole blood, diluted blood, plasma, serum or other form of blood sample, or another type of fluid, to flow therethrough either by capillary action, centrifugation, or under the influence of pneumatic or hydraulic pressure. The porous material from which the matrix 2 is formed preferably possesses the ability to readily absorb or "wick" by capillary action a liquid sample 6 of a broad or finite viscosity or carrying particles or particulates of varying sizes, such as red or white blood cells, proteins (e.g., hemoglobin), leukocytes, granulocytes, and other types of particles suspended in a liquid, and have a porosity that allows the liquid to traverse the width and length of the matrix insert 12 with little or no "clogging". Furthermore, the matrix material should have the ability to act as a carrier for a reagent, for example, functionalized particles 50, such as porous or non-porous beads and nanoparticles, including IMAC agarose-based beads and silica-based beads, like those described in the aforementioned IDEXX patent application, and hold such functionalized particles 50 in an immobilized state without the particles 50 being released when wetted by the liquid sample 6.

Such matrix materials may include, but are not limited to, fibrous material composed of synthetic or natural fibers (e.g., glass or cellulose-based materials or thermoplastic polymers, such as, polyethylene, polypropylene, or polyester); sintered structures composed of particulate materials (e.g., glass or various thermoplastic polymers); or cast membrane films composed of nitrocellulose, nylon, polysulfone or the like (generally synthetic in nature). The porous matrix material may be composed of sintered, fine particles of polyethylene, commonly known as porous polyethylene, such as sintered polyethylene beads; preferably, such materials possess a density of between 0.35 and 0.55 grams per cubic centimeter, a pore size of between 5 and 40 microns, and a void volume of between 40 and 60 percent. Particulate polyethylene composed of cross-linked or ultra high molecular weight polyethylene is preferable. A flow flow matrix composed of porous polyethylene possesses all of the desirable features listed above, and in addition, is easily fabricated into various sizes and shapes. A particularly preferred material is 10-15 micron porous polyethylene from Chromex Corporation FN #38-244-1 (Brooklyn, New York). Another preferred material is Fusion 5™ liquid flow matrix material available from Whatman, Inc., U.S.A., now Global Life Sciences Solutions USA LLC of Pittsburgh, Pennsylvania.

In one form, the porous matrix 2 may have an open pore structure with an average pore diameter of 1 to 250 micrometers and, in further aspects, about 3 to 100 micrometers, or about 10 to about 50 micrometers.

An example of a possible suitable porous material under consideration by the inventors herein and from which the matrix insert 12 may be formed and in which omni-directional flow occurs is a high density or ultra-high molecular weight polyethylene material manufactured by Porex Corporation of Fairburn, Georgia. This material is made from fusing spherical particles of ultra-high molecular weight polyethylene (UHMW-PE) by sintering. This creates a porous structure with an average pore size of eight to 20 microns, depending on the size of the particles (20 to 60 microns, respectively).

While matrices 2 made of polyethylene may be suitable for use, omni-directional flow materials formed of other olefin or other thermoplastic materials, e.g., polyvinyl chloride, polyvinyl acetate, copolymers of vinyl acetate and vinyl chloride, polyamide, polycarbonate, polystyrene, etc., may possibly be used. Examples of such materials include Magna Nylon Supported Membrane from GE Osmonics, Inc. (Minnetonka, Minnesota), Novylon Nylon Membrane from CUNO Inc., now 3M Purification Inc. (Meriden, Connecticut) and Durapore® Membrane from Millipore Corporation (Billerica, Massachusetts), now Merck KGaA of Darmstadt, Germany.

Other porous materials that may be suitable for use in forming the matrix insert 12 include natural, synthetic, or naturally occurring or synthetically modified materials: papers (fibrous) or membranes (microporous) of cellulose materials such as paper, cellulose, and cellulose derivatives such as cellulose acetate and nitrocellulose, fiberglass, glass fiber, cloth, both naturally occurring (e.g., cotton) and synthetic (e.g., nylon); porous fibrous matrices; starch based materials, cross-linked dextran chains; ceramic materials; olefin or thermoplastic materials including those of polyvinyl chloride, polyethylene, polyvinyl acetate, polyamide, polycarbonate, polystyrene, copolymers of vinyl acetate and vinyl chloride and combinations of polyvinyl chloride-silica; and the like. This list is representative, and not meant to be limiting.

A least some of the porous materials for the fluid flow matrix set forth in U.S. Pat. No. 5,726,010, for example, may be used in the formation of the matrix insert 12 of the present invention, and such disclosures are incorporated herein by reference.

Alternatively, the porous matrix 2 itself may be formed of functionalized particles 50, such as the IMAC beads mentioned previously, that are bound together in an immobilized state.

The particles 50 that form the porous matrix insert 12, whether they are spherical or another shape, may be bound together by sintering and/or pressing, or by applying heat. For example, the matrix insert 12 may be formed in a sintering mold; more specifically, the matrix 2 is sintered and/or pressed in an offline form or mold and then inserted or pressed into the lower portion 18 of the cup 4.

Alternatively, the matrix insert 12 may be formed in situ, that is, within the cup 4, by partially filling the cup 4 with particle media, and then a die that forms the upper contour of the matrix insert 12 is brought down on top of the particle media, pressing the particles into the shape of the insert 12. The cup 4, particle media and die could then be heated to bond the particles to themselves and to the interior side walls 28 of the cup 4 to form the matrix insert 12 and to secure the insert 12 to the cup 4 at a desired position therein. As mentioned previously, the media particles, be they spherical or some other shape, that define the porous matrix insert, may have functionalized nanoparticles, IMAC beads or the like attached thereto in an immobilized state, or the media particles themselves may be functionalized so that a targeted component of a liquid sample 6 coming in contact with the matrix insert 12 will adhere directly to the functionalized media particles.

Another method envisioned to be used to form the matrix 2 is to use a binding or adhesive agent to form a polymer or copolymer bond or the like of particles in place of pressure and heat. The process of forming such bonds could be combined with a reagent coating process of the matrix 2 to add a reagent or other functionalized particles 50 to form and bond the particles 50 and immobilize the functionalized reagent to activate the porous matrix 2.

In yet another method of forming the matrix insert 12, raw liquid particle media, such as a thermoplastic resin, formed of functionalized particles 50 or carrying immobilized functionalized particles 50, may be injected into a mold and cured within or outside the mold, the result being the formation of a porous matrix insert 12 having a desired shape and which allows fluid flow therethrough.

In yet a further method of forming the matrix insert 12, the insert 12 may be formed by cutting into sections raw stock media that is porous and allows fluid flow therethrough, the sections being machined to have a particular shape and particular features, such as the standoffs 34, channels 48, central bore 36 and funnel-shaped entry port 46 leading to the bore 36, as shown in FIGS. 1-6, and to be able to fit into, and to conform to, the interior shape of the sample, reagent, mixing or centrifuge cup 4. For the cylindrical matrix insert 12 shown in FIGS. 7-12, a raw media stock in the form of a hollow tube of a given diameter may be cut to length in sections and also machined to provide any desired features, for example, the counterbored, funnel-shaped entry opening 46 that guides the pipette tip 10 towards and through the central bore 36 of the insert 12.

If the matrix insert 12 is formed externally to the cup 4, the matrix media may be coated with the desired reagent or other functionalized particles 50 prior to the insertion of the finished insert 12 into the cup 4 by spraying the coating on the matrix media, or using a dropper, where the coating of functionalized reagent or particles 50 is drawn into the matrix media by capillary action, or forced into the media by pneumatic or hydraulic pressure, immersion of the matrix media into a volume of liquid reagent, and then vacuum drying the functionalized reagent or particles 50 on the matrix media, or by using an ambient or elevated temperature drying process, or by lyophilization. Many, if not all, of these processes may be employed to coat the matrix media with the reagent or functionalized particles 50 in situ, that is, when the matrix media is already present in the cup 4.

The matrix insert 12 formed in accordance with the present invention from functionalized particles 50 or carrying functionalized particles 50 in an immobilized state is used in the manner described below to treat, remove or at least lower the concentration of a component of a liquid sample 6, and reference should now be had to FIGS. 13-16 of the drawings.

In one example of using the matrix 2 of the present invention to remove a blood component, a predetermined volume (for example, 20 microliters) of whole blood or a blood component (e.g., plasma or serum) is aspirated from a sample cup (not shown) into a disposable tip 10 fitted on the end of a pipette 8 forming part of a sample metering device of an automated chemical analyzer. Then, a predetermined volume (for example, 20 microliters) of diluent or buffer solution from another cup (not shown) is aspirated into the pipette tip 10. (Alternatively, the blood sample and diluent or buffer solution may be premixed and aspirated into the pipette tip 10 from the sample cup.)

Figure 13:
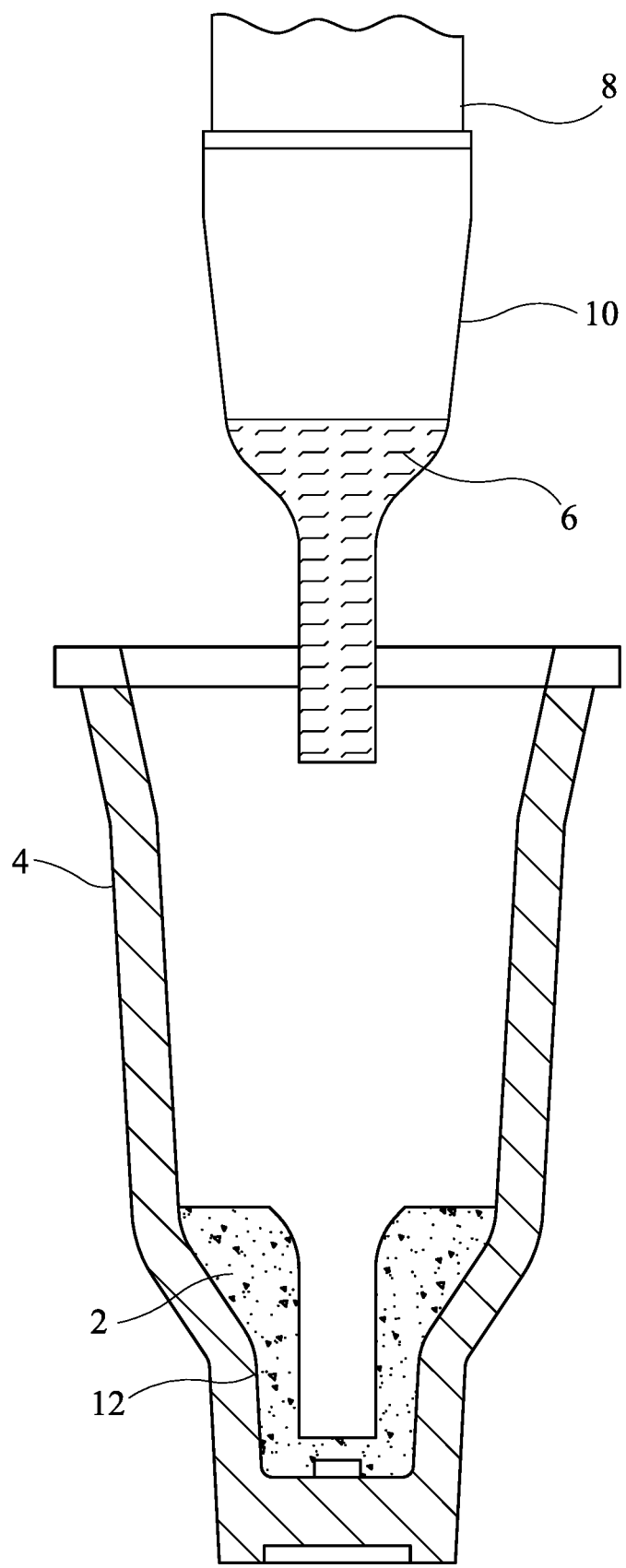
FIG. 13 is a cross-sectional view of the matrix insert or plug, and mixing cup, shown in FIG. 6, and illustrating the tip of a pipette of a sample metering device forming part of an automated chemical analyzer being inserted into the mixing cup to deliver a liquid sample thereto.
Figure 14:
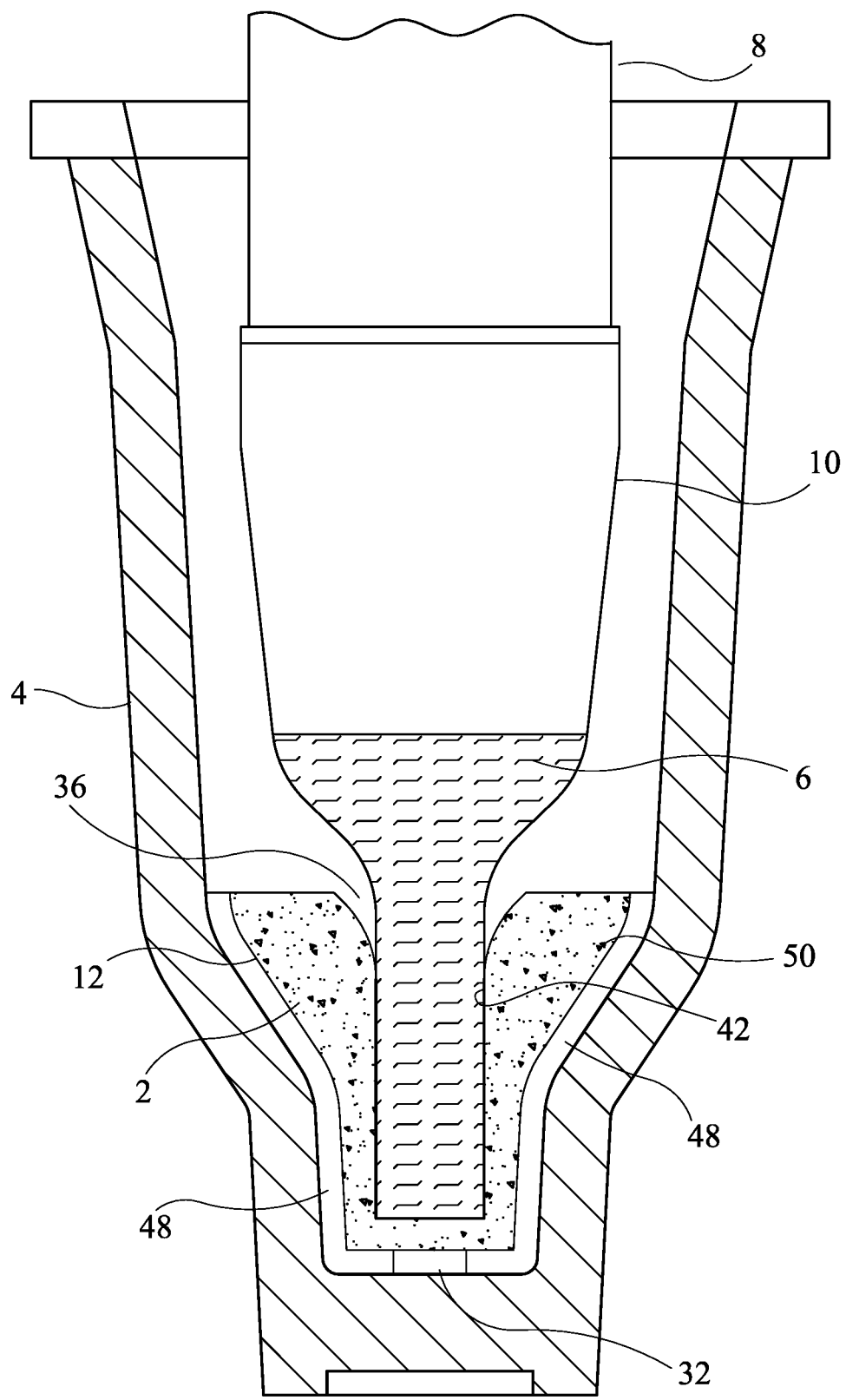
FIG. 14 is a cross-sectional view of the matrix insert or plug, the mixing cup and the pipette tip shown in FIG. 13, and illustrating the pipette tip being fully received by a central bore formed axially through the matrix insert or plug, prior to the liquid sample in the pipette tip being expelled therefrom.

As shown in FIG. 13, the pipette tip 10 containing the blood sample and diluent/buffer solution is lowered into a mixing or reagent cup 4 containing the functionalized matrix insert 12 formed in accordance with the present invention, until the tip 10 is fully or at least partially received by the central bore 36 formed in the matrix insert 12, as shown in FIG. 14. In one form of the invention, the pipette tip 10 forms a seal with the insert 12 at the top surface 38 and at the inner side walls 44 thereof defining the bore 36. In another form of invention, no complete seal is formed between the pipette tip 10 and the matrix insert 12 so that fluid (e.g., the blood sample and diluent/buffer solution) may flow in the annular space 42 between the pipette tip 10 and the matrix insert 12 to the top surface 38 of the insert 12.

Figure 15:
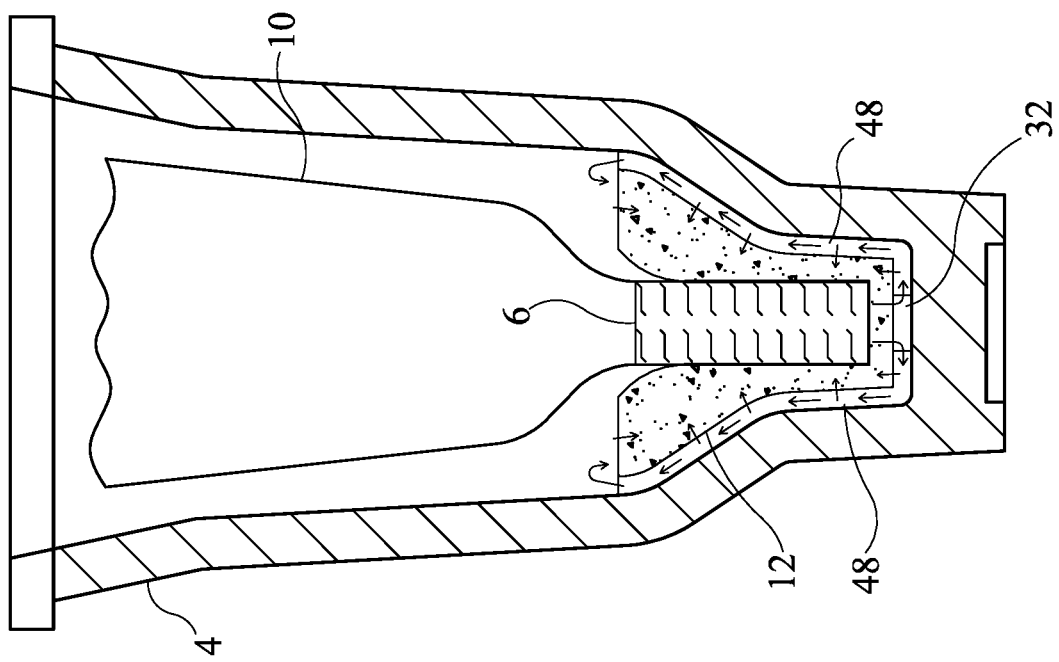
FIG. 15 is a cross-sectional view of the matrix insert or plug, the mixing cup and the pipette tip in their relative positions shown in FIG. 14, and illustrating the paths of flow of liquid sample into the matrix insert or plug after the liquid sample has been expelled from the pipette tip.

Now, and as shown in FIG. 15, the pump action of the pipette 8 is reversed to expel the 40 microliters of blood sample and diluent/buffer solution from the pipette tip 10 into the bottom of the cup 4 (that is, into the liquid sample receiving well or chamber 32, if such is provided) such that the blood sample and diluent/buffer solution will come in contact with the matrix insert 12. The blood sample and diluent/buffer solution will be drawn into the matrix 2 of the insert 12 by capillary action or under the force of hydraulic or pneumatic pressure caused by the pumping action of the pipette 8 where the blood sample and diluent/buffer solution will be exposed to the functionalized particles 50 carried by or forming the matrix 2 of the insert 12.

It should be noted that the blood and diluent/buffer solution not only comes in contact with the matrix 2 at the bottom surface 40 of the insert 12, but also on the lateral sides 26, inner bore wall 44 and top surface 38 thereof as it travels in a reverse flow up the side channels 48 and bore space 42 of the insert 12. The blood sample and diluent/buffer solution will flow into and through the porous matrix insert 12 where the targeted component of the sample, be it hemoglobin or some other protein or cell type, will adhere to the immobilized functionalized particles 50 of the matrix 2 and will similarly become immobilized within the confines of the matrix insert 12. It should be further noted that, if the blood sample is not premixed with the diluent/buffer solution prior to its being added to the matrix insert 12, the flow of the blood sample and diluent/buffer solution into and through the matrix 2 will cause the blood sample and diluent/buffer solution to mix. More specifically, the matrix 2 due to its porosity simultaneously causes turbulence mixing of the blood sample and the diluent/buffer solution as well as bringing about a reaction of the blood sample with the functionalized particles 50.

Figure 16:
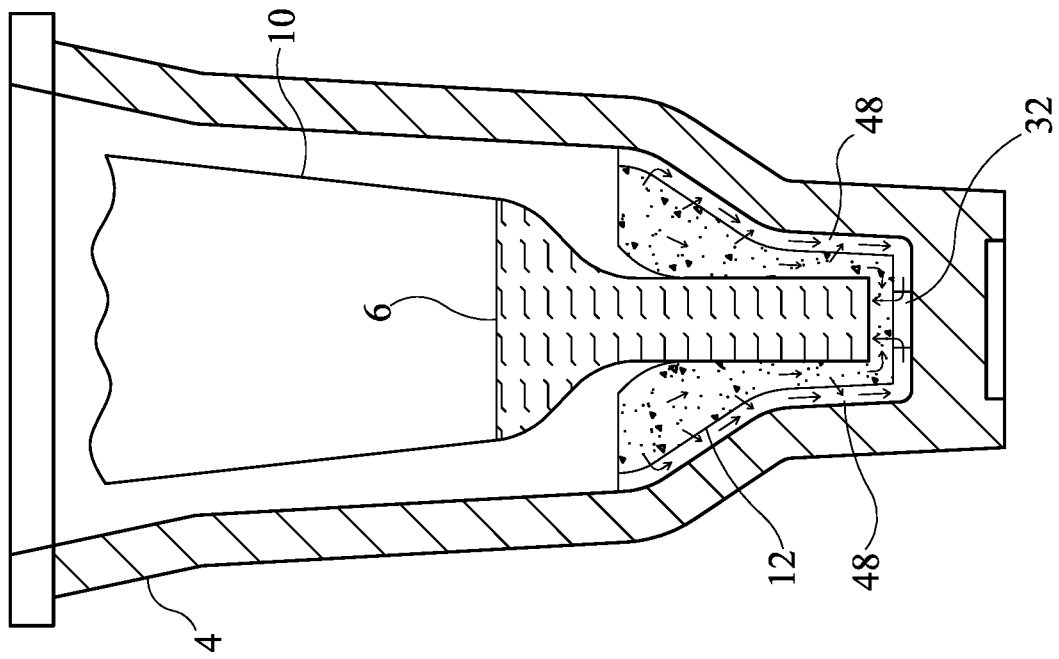
FIG. 16 is a cross-sectional view of the matrix insert or plug, the mixing cup and the pipette tip in their relative positions shown in FIG. 15, and illustrating the paths of flow of "clean" liquid sample from the matrix insert or plug as the liquid sample is being re-aspirated into the pipette tip.

Now, and as shown in FIG. 16, with the pipette tip 10 still in place within the bore 36 of the insert 12, the pump action of the pipette 8 is reversed so that the mixed solution of blood and diluent/buffer, free of the targeted component or having a reduced concentration thereof, is drawn from the matrix 2 of the insert 12 and re-aspirated into the tip 10, most likely along with some air or perhaps bubbles of air. Aspirating air bubbles should not be a problem since the preferred diluent/buffer solution contains an anti-foaming component that dissipates the bubbles; furthermore, the air helps to mix the blood sample and diluent/buffer solution together.

It should be realized that the matrix 2 of the insert 12 may carry or be formed of a high concentration of immobilized functionalized particles 50, more so then when using functionalized particles in solution, as disclosed in the aforementioned IDEXX patent application that teaches a method of removing an interfering component of a liquid sample. Therefore, by using the matrix 2 of the present invention having immobilized functionalized particles 50, it is possible to remove most, if not all, of the targeted component of the liquid sample 6 with a single pass of the liquid sample 6 through the matrix 2. Another advantage of using the functionalized matrix 2 of the present invention is that there is no time required for component-adhering particles to settle by gravity in the liquid sample 6, a step performed in the method disclosed in the aforementioned IDEXX patent application.

In any event, the blood or liquid sample 6 may be passed through the matrix 2 of the insert 12 several times, if needed, by a sequence of expelling the liquid sample 6 and any aspirated air from the pipette tip 10 into the bottom of the cup 4 and re-aspirating the liquid sample 6 drawn from the matrix insert 12 into the tip 10, until substantially all of the targeted component is removed from the liquid sample 6 by its adhering to the functionalized particles 50 of the matrix 2. The final aspiration step in this process will draw as much of the liquid sample 6 out of the matrix 2 as possible, but it is envisioned to be within the scope of the present invention to apply a centripetal force (i.e., centrifugation) to the cup 4 having the insert 12 to help pull the targeted component-free liquid sample 6 from the interstices of the matrix 2. The "clean" liquid sample 6 may now be deposited on a chemical reagent test slide or a sample holding cuvette for testing by an automated chemical analyzer.

Thus, the matrix 2 of the present invention, in the form of an insert 12, acts essentially as a filter or two-directional flow column to remove a targeted component of a liquid sample 6. The matrix 2 itself could be formed of functionalized beads or particles 50, or may be, in another form, formed of micro beads that are used to immobilize functionalized nano beads. The matrix 2 is porous and allows a liquid sample 6 to flow through it.

In another form of the present invention, the insert 12 may be formed from a stack of doughnut-shaped layers of matrix impregnated with functionalized particles 50, the doughnut holes being aligned to define the central bore 36 through the insert 12.

In yet another form of the present invention, the matrix 2 of the insert 12 may be made thicker in the general area between the bottom of the central bore 36 and the bottom surface 40 of the insert 12 above the liquid sample receiving chamber 32 defined by the standoffs 34. It is believed that with the construction described above, the insert 12 may generate better fluid flow through the matrix 2.

Although it is primarily described herein that the insert 12 is placed in a mixing cup 4 used by an automated chemical analyzer, it is envisioned to place the insert 12 in a sample cup, reagent cup, centrifuge cup or any other type of cup or liquid holding vessel that may be used to remove a targeted component of the liquid sample 6 or reduce the concentration thereof in the liquid sample 6, and it should be understood that the term "mixing cup" 4 used herein and in the claims should be interpreted to include all of the aforementioned cups and vessels.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A combination for use in an automated chemical analyzer having a sample metering device comprising:
    a mixing cup, the mixing cup defining an interior cavity; and
    an insert mounted within the interior cavity of the mixing cup wherein the insert includes one or more side walls, a top wall and a bottom wall disposed opposite the top wall, the one or more side walls extending between the top wall and the bottom wall; and
    a porous matrix formed of or carrying in an immobilized state functionalized particles having properties such that a targeted component of a liquid sample adheres to the functionalized particles, the porous matrix having a porosity that allows the liquid sample to flow therethrough, and wherein the insert is formed with a generally frusto-conical shape and includes a generally circular upper portion having a first diameter and situated at or near the top wall thereof, a tapered middle portion of decreasing diameter, extending from the upper portion, and a generally cylindrical lower portion extending from the middle portion and situated at or near the bottom wall thereof, the lower portion having a second diameter which is less than the first diameter of the upper portion.

2. The combination of claim 1, wherein the matrix of the insert is formed of a medium which holds in an immobilized state functionalized particles.

3. The combination as defined by of claim 1 claim 2, wherein the functionalized particles are IMAC (Immobilized Metal Affinity Chromatography) beads.

4. The combination of claim 3, wherein the IMAC beads are at least one of agarose-based beads and silica-based beads.

5. The combination of claim 2, wherein the functionalized particles are nanobeads.

6. The combination of claim 1, wherein the matrix of the insert is formed of functionalized particles.

7. The combination of claim 6, wherein the functionalized particles are IMAC (Immobilized Metal Affinity Chromatography) beads.

8. The combination of claim 7, wherein the IMAC beads are at least one of agarose-based beads and silica-based beads.

9. The combination of claim 8, wherein the functionalized particles are nanobeads.

10. The combination of claim 1, wherein the matrix is formed from a glass fiber-based material that contains a plastic binder.

11. The combination of claim 1, wherein the matrix is formed from a porous material selected from the group consisting of: natural, synthetic, or naturally occurring or synthetically modified materials; fibrous materials; membranes of cellulose materials, including paper, cellulose, and cellulose derivatives, including cellulose acetate and nitrocellulose, fiberglass, glass fiber, cloth, both naturally occurring, including cotton, and synthetic, including nylon; porous gels, including silica gel, agarose, dextran and gelatin;
    porous fibrous matrices; starch based materials; cross-linked dextran chains; ceramic materials;
    olefin and thermoplastic materials, including films of polyvinyl chloride, polyethylene, polyvinyl acetate, polyamide, polycarbonate, polystyrene, copolymers of vinyl acetate and vinyl chloride and combinations of polyvinyl chloride-silica.

12. The combination of claim 1, wherein the matrix is selected from the group of materials consisting of: sintered polyethylene beads;
    nitrocellulose; glass fibers; and paper.

13. The combination of claim 1, wherein the insert has formed in the one or more side walls one or more liquid flow channels, wherein the one or more liquid flow channels extend longitudinally along at least a portion of the one or more side walls, and wherein the one or more channels are in fluid communication with the matrix of the insert.

14. The combination of claim 1, wherein the insert has formed axially therein a central bore, the central bore passing through the insert from the top wall thereof to the bottom wall thereof.

15. The combination of claim 13, wherein the top wall of the insert has formed therein a funnel-shaped entry port, and wherein the funnel-shaped entry port is aligned and in fluid communication with the central bore.

16. The combination of claim 1, wherein the insert includes at least one standoff, the at least one standoff extending outwardly from the bottom wall of the insert a predetermined distance, the at least one standoff helping to define between the bottom wall of the insert and the mixing cup a chamber for receiving the liquid sample when the insert is received by the mixing cup.

17. The combination of claim 1, wherein the insert has formed therein a bore, and wherein the bore is dimensioned to at least partially receive a pipette tip of the sample metering device.

18. The combination of claim 17, wherein the top wall of the insert has formed therein a funnel-shaped entry port, and wherein the funnel-shaped entry port is aligned and in fluid communication with the bore.

19. A method using an automated chemical analyzer for removing a targeted component of a liquid sample comprising the steps of:
aspirating into a pipette tip a volume of the liquid sample;
positioning the pipette tip containing the volume of the liquid sample over a mixing cup having an insert mounted within an interior cavity thereof, wherein the insert includes a porous matrix formed of or carrying in an immobilized state functionalized particles, the porous matrix having a porosity that allows the liquid sample to flow therethrough, the insert further having one or more side walls, a top wall and a bottom wall disposed opposite the top wall, the one or more side walls extending between the top wall and the bottom wall, the insert having formed axially therein a central bore, the central bore passing through the insert from the top wall thereof to the bottom wall thereof, and wherein the bore is dimensioned to at least partially receive the pipette tip;
lowering the pipette tip into the mixing cup such that the pipette tip is at least partially received by the central bore;
expelling the volume of liquid sample from the pipette tip into the insert, wherein the liquid sample expelled from the pipette tip is drawn into the matrix of the insert and the targeted component of the liquid sample adheres to the functionalized particles of the matrix; and
applying a negative hydraulic or pneumatic pressure on the liquid sample within the matrix, whereby a component-free liquid sample free of the targeted component or having a reduced concentration thereof is drawn from the matrix of the insert and aspirated into the pipette tip for subsequent testing by the automated chemical analyzer.

20. The method of claim 19, which further comprises the steps of:
expelling from the pipette tip into the insert for at least a second time the liquid sample drawn from the matrix of the insert and aspirated into the pipette tip, whereby the expelled liquid sample flows into the matrix of the insert for at least a second time; and
applying for at least a second time a negative hydraulic or pneumatic pressure on the liquid sample within the matrix, whereby the component-free liquid sample free of the targeted component or having a reduced concentration thereof is drawn from the matrix of the insert for at least a second time and re-aspirated into the pipette tip.

21. The method of claim 19, wherein the insert has formed in the one or more side walls one or more liquid flow channels, wherein the one or more liquid flow channels extend longitudinally along at least a portion of the one or more side walls, and wherein the one or more channels are in fluid communication with the matrix of the insert; and
wherein the step of expelling the volume of liquid sample from the pipette tip into the insert includes the sub-step of forcing the liquid sample expelled from the pipette tip into the one or more liquid flow channels.

22. The method of claim 19, wherein the insert is positioned within the interior cavity of the mixing cup such that the bottom wall of the insert is spaced from an interior bottom surface of the mixing cup to define therewith a chamber for receiving the liquid sample; and
wherein the step of expelling the volume of liquid sample from the pipette tip into the insert includes the sub-step of forcing the liquid sample expelled from the pipette tip into the liquid sample receiving chamber.

23. The method of claim 19, wherein the step of lowering the pipette tip into the mixing cup such that the pipette tip is at least partially received by the central bore of the insert includes the sub-step of forming a substantially liquidtight seal between the pipette tip and an inner wall of the insert that defines the central bore thereof.

24. The method as defined by of claim 19, wherein the central bore of the insert is dimensioned to provide an annular space between at least a portion of an inner wall of the insert defining the central bore and at least a portion of the pipette tip when the pipette tip is at least partially received by the central bore of the insert, and wherein the annular space is in fluid communication with the matrix of the insert; and
wherein the step of expelling the volume of liquid sample from the pipette into the insert includes the sub-step of forcing the liquid sample expelled from the pipette tip into the annular space.

25. A method using an automated chemical analyzer for removing a targeted component of a liquid sample comprising the steps of:
aspirating into a pipette tip a volume of the liquid sample;
positioning the pipette tip containing the volume of the liquid sample over a mixing cup having an insert mounted within an interior cavity thereof, wherein the insert includes a porous matrix formed of or carrying in an immobilized state functionalized particles, the porous matrix having a porosity that allows the liquid sample to flow therethrough, the insert further having one or more side walls, a top wall and a bottom wall disposed opposite the top wall, the one or more side walls extending between the top wall and the bottom wall, the insert having formed therein a bore, and wherein the bore is dimensioned to at least partially receive the pipette tip;
lowering the pipette tip into the mixing cup such that the pipette tip is at least partially received by the bore;
expelling the volume of liquid sample from the pipette tip into the insert, wherein the liquid sample expelled from the pipette tip is drawn into the matrix of the insert and the targeted component of the liquid sample adheres to the functionalized particles of the matrix; and applying a negative hydraulic or pneumatic pressure on the liquid sample within the matrix, whereby a component-free liquid sample free of the targeted component or having a reduced concentration thereof is drawn from the matrix of the insert and aspirated into the pipette tip for subsequent testing by the automated chemical analyzer.

26. The method of claim 25, which further comprises the steps of:

expelling from the pipette tip into the insert for at least a second time the liquid sample drawn from the matrix of the insert and aspirated into the pipette tip, whereby the expelled liquid sample flows into the matrix of the insert for at least a second time; and applying for at least a second time a negative hydraulic or pneumatic pressure on the liquid sample within the matrix, whereby the component-free liquid sample free of the targeted component or having a reduced concentration thereof is drawn from the matrix of the insert for at least a second time and re-aspirated into the pipette tip.

27. The method of claim 25, wherein the step of lowering the pipette tip into the mixing cup such that the pipette tip is at least partially received by the bore of the insert includes the sub-step of forming a substantially liquidtight seal between the pipette tip and an inner wall of the insert that defines the bore thereof.

28. The method of claim 25, wherein the bore of the insert is dimensioned to provide an annular space between at least a portion of an inner wall of the insert defining the bore and at least a portion of the pipette tip when the pipette tip is at least partially received by the bore of the insert, and wherein the annular space is in fluid communication with the matrix of the insert; and wherein the step of expelling the volume of liquid sample from the pipette into the insert includes the sub-step of forcing the liquid sample expelled from the pipette tip into the annular space.

* * * * *